(12) United States Patent
Strandjord et al.

(10) Patent No.: US 10,837,779 B2
(45) Date of Patent: Nov. 17, 2020

(54) APPARATUS FOR ENHANCED BEAT NOTE DETECTION

(71) Applicant: Honeywell International Inc., Morris Plains, NJ (US)

(72) Inventors: Lee K. Strandjord, Tonka Bay, MN (US); Simon Ayotte, Saint-Augustin-de-Desmaures (CA); Glen A. Sanders, Scottsdale, AZ (US)

(73) Assignee: Honeywell International Inc., Charlotte, NC (US)

(*) Notice: Subject to any disclaimer, the term of this patent is extended or adjusted under 35 U.S.C. 154(b) by 18 days.

(21) Appl. No.: 16/041,205

(22) Filed: Jul. 20, 2018

(65) Prior Publication Data

US 2020/0025568 A1    Jan. 23, 2020

(51) Int. Cl.
*G01C 19/72*    (2006.01)

(52) U.S. Cl.
CPC ......... *G01C 19/727* (2013.01); *G01C 19/721* (2013.01)

(58) Field of Classification Search
CPC ..... G01C 19/727; G01C 19/721; G01C 19/72
See application file for complete search history.

(56) References Cited

U.S. PATENT DOCUMENTS

| | | | |
|---|---|---|---|
| 4,551,021 A | * 11/1985 | Callaghan ............ | G01C 19/665 356/473 |
| 5,355,216 A | * 10/1994 | Kim ..................... | G01C 19/721 356/464 |
| 8,830,479 B2 | 9/2014 | Qiu et al. | |
| 8,947,671 B2 | 2/2015 | Strandjord et al. | |
| 9,115,994 B2 | 8/2015 | Strandjord et al. | |
| 9,772,189 B2 | 9/2017 | Strandjord et al. | |

(Continued)

FOREIGN PATENT DOCUMENTS

| CN | 106289223 A | 1/2017 |
|---|---|---|
| EP | 2589929 A2 | 5/2013 |

(Continued)

OTHER PUBLICATIONS

Strandjord et al, "Large Range, High Resolution Interferometer for Wide Range of Sensing Applications", U.S. Appl. No. 15/877,985, filed Jan. 23, 2018, pp. 1-43, Published in: US.

(Continued)

*Primary Examiner* — Hwa Andrew Lee
(74) *Attorney, Agent, or Firm* — Fogg & Powers LLC

(57) ABSTRACT

A method comprises receiving a first optical signal and a second optical signal at or near an optical resonator, where the first optical signal includes a clockwise (CW) optical signal and the second optical signal includes a counter clockwise optical signal; injecting the first optical signal and the second optical signal into a resonator loop closure optics system of the optical resonator; sampling a portion of the first optical signal and a portion of the second optical signal; combining the portion of the first optical signal and the second optical signal; converting the combined optical signals to an analog electrical signal; digitizing the analog electrical signal; storing an estimated frequency of a beat signal created by a combination of the CW optical signal and the CCW optical signal; and using the stored estimated beat signal frequency, digitally phase lock to a frequency of the beat signal.

8 Claims, 6 Drawing Sheets

(56) References Cited

U.S. PATENT DOCUMENTS

2014/0211211 A1  7/2014  Qiu et al.
2017/0299390 A1  10/2017  Schwartz et al.

FOREIGN PATENT DOCUMENTS

| EP | 2770298 A2 | 8/2014 |
| EP | 3106835 A1 | 12/2016 |
| EP | 3508817 A1 | 7/2019 |

OTHER PUBLICATIONS

European Patent Office, "Extended European Search Report from EP Application No. 19186660.7", from Foreign Counterpart to U.S. Appl. No. 16/041,205, dated Dec. 19, 2019, pp. 1-8, Published: EP.
European Patent Office, "Communication pursuant to Article 94(3) from EP Application No. 19186660.7", from Foreign Counterpart to U.S. Appl. No. 16/041,205, dated Jul. 20, 2020, pp. 1 through 7, Published: EP.

\* cited by examiner

APPARATUS FOR ENHANCED BEAT NOTE DETECTION

BACKGROUND

Resonant fiber optic gyroscopes (RFOGs) have better signal to noise sensitivity for rotation sensing ("rotation sensitivity") for a given diameter than laser ring gyroscopes and interferometer fiber optic gyroscopes. Thus, RFOGs are desirable because a given level of rotation sensitivity can be achieved with smaller RFOGs, reducing the size of inertial navigation systems incorporating RFOGs. Rotation in RFOGs is determined by a difference of clockwise and counter clockwise resonance frequencies of a fiber ring resonator. Resonance frequency may otherwise be referred to as resonance frequency. The resonance frequencies are measured with optical signals respectively from optical sources generating clockwise and counter clockwise optical signals (respectively a clockwise optical source and a counter clockwise optical source). Therefore, the frequency difference of clockwise and counter clockwise optical signals at the resonator input is a measure of rotation. Conventionally, the frequency measurements of such clockwise and counter clockwise optical signals are made proximate to the clockwise optical source and the counter clockwise optical source.

Varying temperatures of the optical fibers coupling the optical sources to the optical resonator can change the frequencies of the clockwise and counter clockwise optical signals propagating through the optical fibers. This arises due to time varying indices of refraction, and physical path-lengths, of the optical fibers which result in time varying optical path lengths of the optical fibers. The optical fibers of the clockwise and counter clockwise optical signal paths can only be matched with limited precision. Thus, when temperature fluctuations occur, the difference between the frequencies of the clockwise and counter clockwise optical signals frequencies will not be the same proximate to the optical sources and proximate to the RFOG's optical resonator. An RFOG can be designed to measure frequency differences as low as tenths of Micro hertz. Thus, even very small temperature fluctuations create undesirable bias error in the RFOG.

Because the frequency measurements of the clockwise and counter clockwise optical signals are made proximate to the clockwise optical source and the counter clockwise optical source, additional bias error can arise due to time varying electrical phenomena, such as offset voltages drifting over time and 1/f noise, in electrical circuitry in feedback loops in the RFOG. Such time varying electrical phenomena also results in the difference between the frequencies of the clockwise and counter clockwise optical signals frequencies proximate to the optical sources and those that are proximate to the RFOG's optical resonator. Therefore, there is a need to reduce this bias error.

SUMMARY

A method is provided. The method comprises receiving a first optical signal and a second optical signal at or near an optical resonator, where the first optical signal includes a clockwise (CW) optical signal and the second optical signal includes a counter clockwise optical signal; injecting the first optical signal and the second optical signal into a resonator loop closure optics system of the optical resonator; sampling a portion of the first optical signal and a portion of the second optical signal; combining the portion of the first optical signal and the second optical signal; converting the combined optical signals to an analog electrical signal; digitizing the analog electrical signal; storing an estimated frequency of a beat signal created by a combination of the CW optical signal and the CCW optical signal; and using the stored estimated beat signal frequency, digitally phase lock to a frequency of the beat signal.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
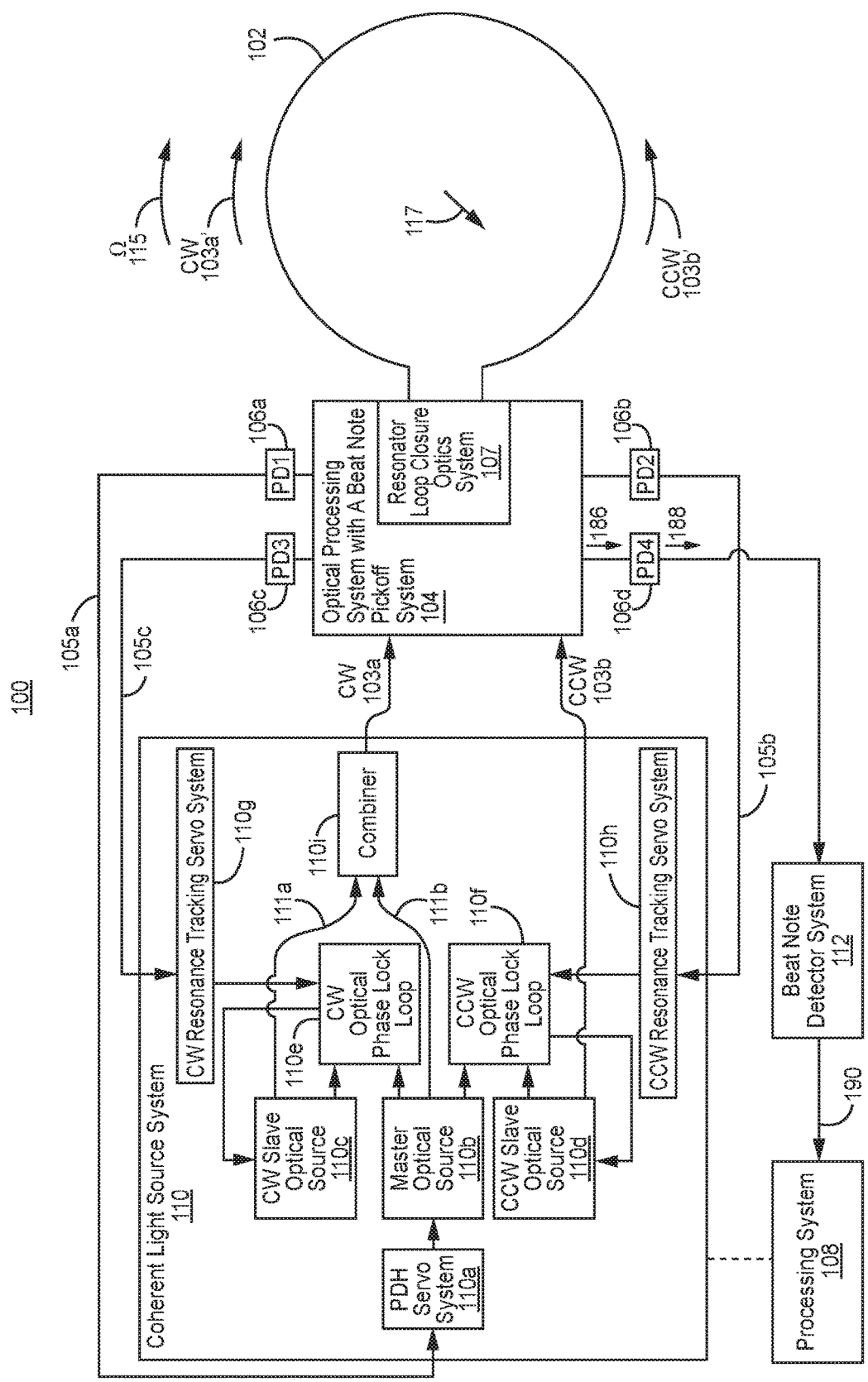
FIG. 1 illustrates a block diagram of one embodiment of an RFOG with an optical processing system with enhanced beat note detection.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

To solve the aforementioned problem, embodiments of the invention sample the clockwise and counter clockwise optical signals proximate to the optical resonator of a resonant fiber optic gyroscope. Proximate to the optical resonator means where the clockwise and counter clockwise optical signals are either entering or exiting the optical resonator. However, because the there may be other frequency components present, e.g. due to modulation and use of a third, master, optical source, a conventional frequency counter can not be used to detect the beat frequency. Rather, a beat frequency detector is used to detect the beat frequency, even in the presence of the other frequency components. Beat note detector is defined to mean a frequency detector implemented with a digital phase lock loop configured to detect a frequency of a beat note signal when the beat note signal may be in the presence of other frequency components separated by more than the frequency bandwidth of the digital phase lock loop.

A resonant fiber optic gyroscope (RFOG) with a beat note pickoff system may be used to overcome the above referenced problem. FIG. 1 illustrates a block diagram of one embodiment of an RFOG with an optical processing system with enhanced beat note detection 100. The embodiment of FIG. 1 is but one RFOG architecture in which the present invention can be implemented.

In the illustrated embodiment, the RFOG with an optical processing system with enhanced beat note detection 100 includes an optical resonator coil 102, an optical processing system with a beat note detector system 104, a first photodetector (PD1) 106a, a second photodetector (PD2) 106b, a third photodetector (PD3) 106c, a fourth photo detector (PD4) 106d, a coherent light source system 110, a beat note detector system 112, and a processing system 108. For purposes of clarity, the processing system 108 is an optional component of the RFOG with an optical processing system with enhanced beat note detection 100. As will be subsequently described, the photodetectors may optionally be part of the optical processing system with a beat note detector system 104.

The optical resonator coil 102 is coupled to the optical processing system with a beat note detector system 104. In another embodiment, the optical resonator coil 102 is comprised of turns or windings of optical fiber. The optical processing system with a beat note detector system 104 includes a resonator loop closure optics system 107. An optical resonator comprises the optical resonator coil 102 and the resonator loop closure optics system 107.

The first photodetector 106a, the second photodetector 106b, the third photodetector 106c, the fourth photodetector 106d, and the coherent light source system 110 are coupled to optical processing system with a beat note detector system 104. Photodetectors convert incident optical signals into electrical signals. The amplitude of the electrical signal generated by a photodetector is linearly related to the intensity of the incident optical signal. Although four photodetectors are exemplified herein, other embodiments of the RFOG with enhanced beat note detection 100 may have five photodetectors, and the coherent light source system 110 would be alternatively implemented with two Pound-Drever-Hall (PDH) servo systems as illustrated, for example, in U.S. Pat. No. 8,947,671 which is incorporated by reference herein in its entirety. The optional fifth photodetector (PD5) is referenced by way of example elsewhere herein. However, in other embodiments of the RFOG with enhanced beat note detection 100 illustrated in FIG. 1, the optional fifth photodetector (PD5) can be used for diagnostic purposes.

In one embodiment, the processing system 108 is a state machine. In another embodiment, the processing system comprises a processor circuitry coupled to memory circuitry. The processing circuitry may be implemented with at least one of a microprocessor, a microcontroller, an application specific integrated circuit, and/or a gate array. The memory circuitry may be implemented by at least one of random access memory, read only memory, Flash memory, magnetic memory such as a hard drive, and/or optical memory such as an optical drive and optical disc. The processing circuitry may execute software and/or firmware stored in the memory circuitry, e.g. to determine angular rate of rotation. The processing system 108 may also be referred to as digital data processing system.

The processing system 108 is coupled to the beat note detector system 112. Optionally, the processing system 108 is also coupled to the coherent light source system 110. Optionally, the coherent light source system 110 is coupled to the beat note detector system 112. The processing system 108 determines the angular rate of rotation of the optical resonator coil 102 by processing signals (e.g. beat note frequency data) from the beat note detector system 112. The memory may include program instructions which are executed by the processor to determine the angular rate of rotation 115 of the optical resonator coil 102 about an input axis 117. The angular rate of rotation 115 is determined by the difference between the resonance frequencies of the optical resonator in the clockwise and counterclockwise directions. This is measured by locking the frequencies, $f_{cw}$ and $f_{ccw}$, of the clockwise (CW) slave optical signal (or first optical signal) 111a and the counter clockwise (CCW) slave optical signals 103b (or second optical signal) to the CW and CCW resonances, respectively, of the optical resonator comprising the optical resonator coil 102 and the resonator loop closure optics system 107. Thus, the processing system 108 uses a frequency difference (or beat note frequency data), $\Delta f$, between the frequency, $f_{cw}$, of the CW slave optical signal and the frequency, $f_{ccw}$, of the CCW slave optical signal to derive the rotation rate output of the optical resonator, e.g. the RFOG with enhanced beat note detection 100. The first optical signal 111a is combined with a master optical signal (or second optical signal) 111b in an optical combiner (combiner) 110i prior to being coupled to the optical processing system with a beat note detector system 104, and then to the optical resonator. The CCW slave optical signal 103b is also coupled to the optical processing system with a beat note detector system 104, and then the optical resonator. In another embodiment, signals representative of difference between $f_{ccw}$ and the master laser frequency and $f_{cw}$ and the master laser frequency are respectively provided by a CCW resonance tracking servo system 110h and a CW resonance tracking servo system 110g in the coherent light source system 110. In a further embodiment, the angular rate of rotation 115 about the input axis 117 is an angular rate of rotation, $\Omega$, 115 where $\Omega=(\lambda*\Delta f*P)/(4*A)$, $\lambda$ is substantially equal to the average wavelength of the clockwise light signal 103a and the counter-clockwise light signal 103b. A is the area enclosed by the optical resonator coil 102 and P is the perimeter of the optical resonator path of the optical resonator coil 102 and resonator loop closure optics system 107.

The coherent light source system 110, or components therein, may include components not shown in FIG. 1. Such components may be used to amplitude and phase modulate optical signals, and to amplify or split optical signals. In one embodiment, such components include intensity modulator(s), phase modulator(s), optical amplifier(s), optical isolator(s), and optical passive device(s). Optionally, the processing system 108 includes a feed-forward rate processor or algorithm like that illustrated in U.S. Pat. No. 9,772,189 (the '189 Patent) which is incorporated by reference herein in its entirety. When a clockwise (CW) optical signal 103a and a counter-clockwise (CCW) optical signal 103b are separated by a free spectral range (FSR), the feed-forward rate processor (and thus the processing system 108) can remove the FSR component and provide the beat note detector with an estimate of the frequency of the beat note signal. The feed-forward rate processor also has the benefit of removing line shape asymmetry gradient error.

The coherent light source system 110 generates the CW optical signal 103a and the CCW optical signal 103b which are coupled to the optical resonator coil 102 by the optical processing system with a beat note detector system 104. Optionally, the CW optical signal 103a and the CCW optical signal 103b are linearly polarized.

The optical processing system with a beat note detector system 104 generates optical feedback signals which are converted to electrical feedback signals by the first photodetector 106a, the second photodetector 106b, and the third photodetector 106c. The first photodetector 106a, the second photodetector 106b, and the third photodetector 106c respectively generate a first feedback signal 105a, a second feedback signal 105b, and a third feedback signal 105c which are coupled to the coherent light source system 110.

The optical processing system with a beat note pickoff system 104 generates an optical beat note pickoff signal 186. The fourth photodetector 106d converts the optical beat note pickoff signal 186 to an electrical beat note pickoff signal 188. The beat note detector system 112 is configured to receive the electrical beat note pickoff signal 188. For purposes of clarity, the optical beat note pickoff signal 186 and the electrical beat note pickoff signal 188 may contain frequency components (subsequently described) other than the beat note signal.

The beat note detector system 112 is configured to receive the electrical beat note pickoff signal 188. The beat note detector system 112 extracts, using digital signal processing, the frequency of the beat note signal from the electrical beat note pickoff signal 188. The beat note detector system 112 generates a beat note frequency digital value (or a digital value representing the beat note frequency) 190. The processing system 108 is configured to receive the beat note frequency digital value 190. In the manner described elsewhere herein, the beat note frequency digital value 190 is used, e.g. by the processing system 108, to determine the rate of rotation of the RFOG with an optical processing system with enhanced beat note detection 100. Because the beat note frequency data is obtained from the CW optical signal 103a and the CCW optical signal 103b proximate to the optical resonator, the bias error arising from time and temperature dependent indices of refraction and offset voltages is diminished.

In the illustrated embodiment, the coherent light source system 110 comprises a PDH servo system 110a, a CW slave optical source 110c, a master optical source 110b, a CCW slave optical source 110d, a CW resonance tracking servo 110g, a CW optical phase lock loop 110e, a CCW optical phase lock loop 110f, a CCW resonance tracking servo system 110h, and an optical combiner (combiner) 110i. The PDH servo system 110a is configured to receive a first feedback signal 105a, and is coupled to the master optical source 110b and the first photodetector 106a. The CW resonance tracking servo 110g is configured to receive the third feedback signal 105c, and is coupled to the CW optical phase lock loop 110e and the third photodetector 106c. The CW optical phase lock loop 110e is coupled to the CW slave optical source 110c and the master optical source 110b. The CCW resonance tracking servo system 110h is configured to receive the second feedback signal 105b, and is coupled to the CCW optical phase lock loop 110f and the second photodetector 106b. The CCW optical phase lock loop 110f is coupled to the CCW slave optical source 110d and the master optical source 110b.

The optical combiner 110i combines a first optical signal 111a emitted from the CW slave optical source 110c and a second optical signal 111b emitted from the master optical source 110b, and forms the CW optical signal 103a. The CCW slave optical source 110d generates the CCW optical signal 103b.

The first feedback signal 105a and the PDH servo system 110a lock the carrier frequency of the second optical signal 111b emitted by the master optical source 110b to a longitudinal resonance frequency or to a frequency that is offset from a longitudinal resonance frequency of the optical resonator by a fixed frequency (offset frequency). The longitudinal resonance frequency equals q multiplied by a FSR of the optical resonator, where q is an integer. In some embodiments, the carrier frequency of the second optical signal 111b is locked to q times FSR, or in some embodiments it is locked to $(q+\frac{1}{2})*FSR$. The difference between the longitudinal resonance frequency and the corresponding carrier frequency is the frequency offset.

The third feedback signal 105c and the CW resonance tracking servo system 110g and the CW optical phase lock loop 110e lock the carrier frequency of the first optical signal 111a emitted by the CW slave optical source 110c to a resonance frequency or to a frequency that is offset from a CW resonance frequency of the optical resonator by a fixed offset frequency. The CW resonance frequency equals p multiplied by a free spectral range (FSR) of the optical resonator, where p is an integer. In some embodiments, the carrier frequency of the first optical signal 111a is locked to p times FSR, or in some embodiments it is locked to $(p+\frac{1}{2})*FSR$.

The second feedback signal 105b, the CCW resonance tracking servo system 110h, and CCW phase lock loop 110f lock the carrier frequency of the CCW optical signal 103b emitted by the CCW slave optical source 110d to a CCW resonance frequency or to a frequency that is offset from a CCW resonance frequency of the optical resonator by a fixed offset frequency. The CCW resonance frequency equals m multiplied by a free spectral range (FSR) of the optical resonator, where m is an integer. In some embodiments, the carrier frequency of the CCW optical signal 103b is locked to m times FSR, or in some embodiments it is locked to $(m+\frac{1}{2})*FSR$. In one embodiment, q, p, and m are different integer numbers.

When the CW and CCW carrier frequencies are both locked to offset frequencies, the frequency offsets from optical resonator resonance frequencies are substantially equal; hence, the difference between the carrier frequencies of the first optical signal 111a and the CCW optical signal 103b are equal to $\Delta f$ as described above, and rotation rate can be derived from $\Delta f$ as described above.

In one embodiment, the frequency offsets of the first optical signal 111a and the CCW optical signal 103b are substantially zero frequency. In another embodiment, each frequency offset is substantially one half of a free spectral range of the optical resonator. In all embodiments, the first optical signal 111a, the second optical signal 111b, and CCW optical signal 103b are frequency modulated, e.g. by frequency modulating respectively the CW slave optical source 110c, the master optical source 110b, and the CCW slave optical source 110d, to determine optical resonator resonance frequencies. In one embodiment, modulation frequencies for the CW slave optical source 110c, the master optical source 110b, and the CCW slave optical source 110d are all different, so that the CCW resonance tracking servo system 110h, the CW resonance tracking servo system 110g, and the PDH servo system 110a may distinguish detected optical signals from each of the CW slave optical source 110c, the master optical source 110b, and the CCW slave optical source 110d. The frequency modulation causes each of the first optical signal 111a, the second optical signal 111b, and the CCW optical signal 103b to have a spectrum of frequencies centered about a corresponding carrier frequency.

In embodiments where the carrier frequencies of the first optical signal 111a and the CCW optical signal 103b, respectively emitted by the CW slave optical source 110c and the CCW slave optical source 110d, are locked to a frequency offset of substantially one half free spectral range from a resonance frequency of the optical resonator in the CW and CCW directions respectively, the odd sidebands of the CW slave optical source 110c and the CCW slave optical source 110d are locked onto resonance frequencies in the CW and CCW directions respectively. This condition is substantially the same for measuring rotation rate as the case of locking CW and CCW slave optical source carrier frequencies to CW and CCW resonance frequencies of the optical resonator.

In one embodiment, the carrier frequencies of first optical signal 111a, the second optical signal 111b, and the CCW optical signal 103b are controlled as follows. The carrier frequency of the second optical signal 111b is locked to a resonance or an offset frequency corresponding to the CW direction of the optical resonator as shown in FIG. 1. The photodetector PD1 106a detects an incident optical signal, and generates the corresponding first feedback 105a which is provided to the PDH servo system 110a. The PDH servo system 110a is responsive to a frequency component in first feedback signal 105a that is related to the frequency of modulation applied to the carrier frequency of the master optical source 110b. Portions of the second optical signal 111b, emitted by the master optical source 110b, are respectively coupled to the CW optical phase lock loop 110e and the CCW optical phase lock loop 110f. A portion of the first optical signal 111a emitted by the CW slave optical source 110c, and a portion of the CCW optical signal 103b, emitted by the CCW slave optical source 110d, are respectively coupled to the CW phase lock loop 110e and the CCW phase lock loop 110f. The carrier frequency of the first optical signal 111a is locked to the carrier frequency of the second optical signal 111b within a tunable difference frequency of $f_1$ by the CW optical phase lock loop 110e. The carrier frequency of the CCW optical signal is locked to the master carrier frequency within a tunable difference frequency of $f_2$ by the CCW optical phase lock loop 110f. A tunable difference frequency is a frequency within the tuning range of the corresponding servo system. The CW resonance tracking servo system 110g and the CCW resonance tracking servo system 110h control tunable difference frequencies $f_1$ and $f_2$ so that the carrier frequency of the first optical signal is locked to the CW resonance of the optical resonator (or at a frequency offset of substantially one half free spectral range from it) and the carrier frequency of the CCW optical signal is locked to the CCW resonance of the resonator (or to a frequency offset of substantially one half free spectral range from it). The tunable difference frequencies $f_1$ and $f_2$ are controlled such that the desirable offset of the CW and CCW carrier frequencies from resonance (e.g., substantially zero or substantially one half free spectral range) are maintained during rotation rate changes, and changing environmental conditions, e.g. temperature and vibrations, that can cause the optical resonator resonances to shift over time.

As shown in FIG. 1, the first optical signal 111a emitted from the CW slave optical source 110c and the second optical signal 111b emitted from the master optical source 110b are combined in optical combiner 110i prior to being coupled to the optical processing system with a beat note detector system 104. Optical combiner 110i may be a bulk optic beam splitter, or a fiber optical direction coupler, or another waveguide directional optical coupler.

In one embodiment, the master optical source 110b, the CW optical source 110c and the CCW optical source 110d each respectively comprise a LASER. Each optical source may include two or more optical outputs provided, e.g., to the optical resonator and optical phase lock loop(s) and implemented with an optical splitter. One or more optical sources may include a phase modulator to frequency modulate respective LASER(s). One or more optical sources may include intensity (or amplitude) modulators to compensate for phase modulation to amplitude modulation noise in phase modulator(s), to equalize the amplitude levels of the baseband component emitted by the slave optical sources, and to stabilize the second optical signal 111b emitted by the master optical source 110b. Each optical source may include optical isolators to prevent leakage of undesired signal into such sources. In another embodiment, the PDH servo system 110a, the CW resonance tracking servo system 110g, and the CCW resonance tracking servo system 110h are respectively implemented with electronic circuitry.

Optionally, the coherent light source system 110, the beat note detector system 112, and/or the processing system 108 may be integrated, e.g. in a single photonics integrated circuit. The single photonics integrated circuit may be formed on a silicon or compound semiconductor substrate. The clockwise optical signal 103a and the counter clockwise optical signal 103b may optionally be coupled from the coherent light source system 110 by very short waveguides, e.g. optical fibers, or by free space. This would diminish the bias error arising from the optical fibers as discussed above. However, bias errors arising from electrical phenomena in electronics in feedback loops of the RFOG still remains, and is addressed using the beat note detector 112.

Figure 2A:
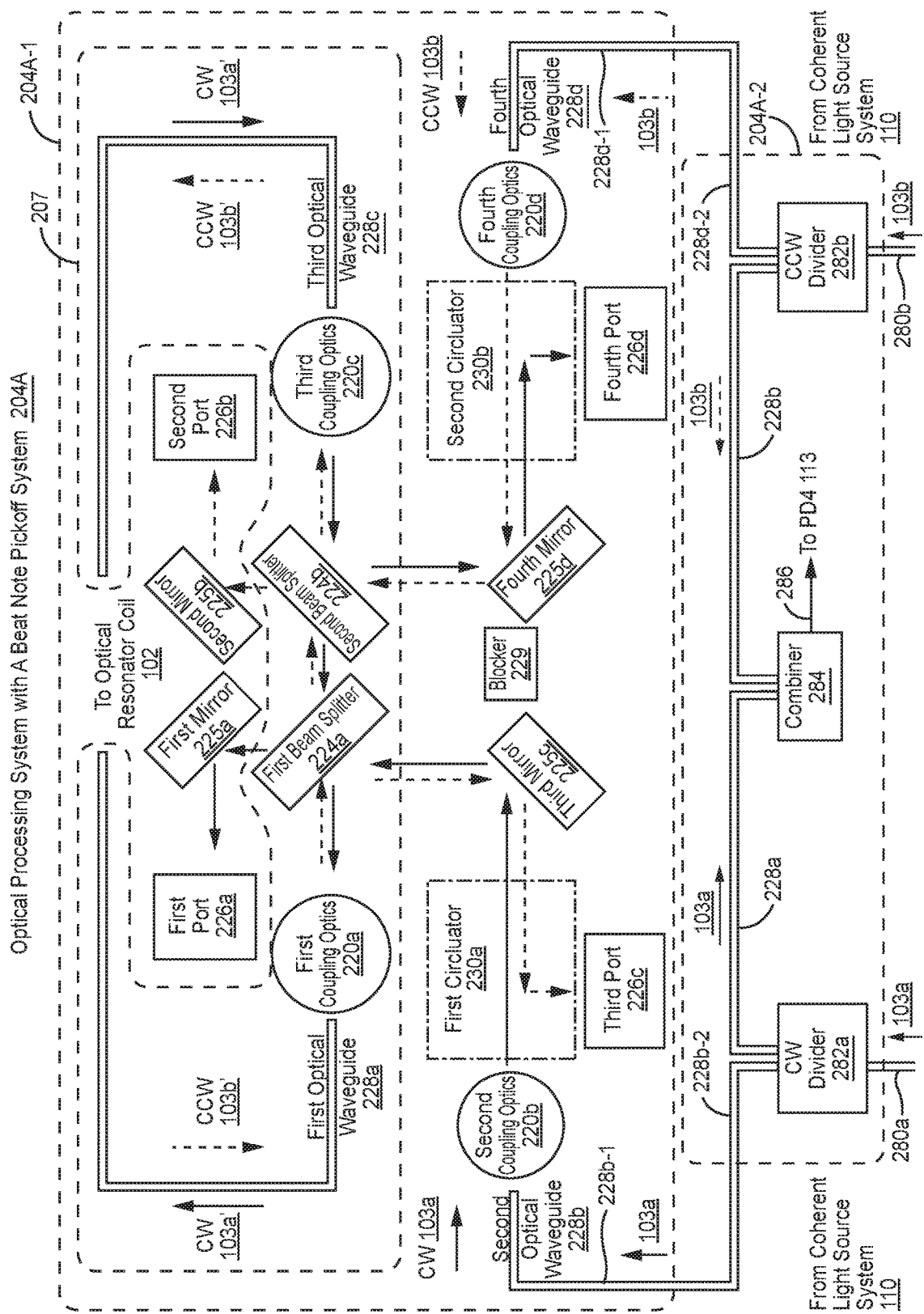
FIG. 2A illustrates one embodiment of the optical processing system with a beat note pickoff system.

FIG. 2A illustrates one embodiment of the optical processing system with a beat note pickoff system (optical processing system) 204A. The optical processing system 204A comprises an RFOG optical processing system 204A-1 coupled to a beat note pickoff system 204A-2.

Embodiments of all or a portion of the illustrated optical processing systems with a beat note pickoff system may also be referred to as "optical benches". Optionally, in FIGS. 2A-2C, the RFOG optical processing systems 204A-1, 204B-1, 204C-1 may be implemented with an optical bench. However, alternatively, more or fewer components of the optical processing systems 204A, 204B, 204C may be included in the corresponding optical bench. For example, a first portion and/or a second portion of the RFOG optical processing system and/or a beat note pickoff system, which are described below for the optical processing systems 204A, 204B, 204C, may or may not be included in the optical bench. Optionally, the optical bench is formed on a substrate such as silicon or another insulator such as glass.

The beat note pickoff system 204A-2 comprises a second portion of the second optical waveguide 228b-2, a second portion of the fourth optical waveguide 228d-2, a fifth optical waveguide 280a, a sixth optical waveguide 280b, a seventh optical waveguide 288a, an eighth optical waveguide 288b, a CW optical divider (CW divider) 282a, a CCW optical divider (CCW divider) 282b, and an optical combiner (combiner) 284. Optical dividers may also be know as optical power dividers and optical combiners, and may be implemented with optical waveguide coupler such as optical fiber couplers.

The CW optical signal 103a and the CCW optical signal 103b are respectively coupled from the coherent light source system 110 respectively by the fifth optical waveguide 280a and the sixth optical waveguide 280b. The fifth optical waveguide 280a and the sixth optical waveguide 280b are respectively coupled to the CW divider 282a and the CCW divider 282b. A portion of the CW optical signal 103a and a portion of the CCW optical signal 103b are respectively coupled from the CW divider 282a and the CCW divider 282b to the combiner 284. The CW divider 282a and the CCW divider 282b may be implemented with optical taps, e.g. fiber optical couplers. The CW divider 282a and the CCW divider 282*b* are respectively coupled by the seventh optical waveguide 288*a* and the eighth optical waveguide 288*b* to inputs of a combiner 284. The optical combiner 284 combines the portions of the CW optical signal 103*a* and the CCW optical signal 103*b* (from the CW divider 282*a* and the CCW divider 282*b*). The combiner 284 may be an optical coupler. Thus, the portions of the CW optical signal 103*a* and the CCW optical signal 103*b* are respectively coupled from the CW divider 282*a* and CCW divider 282*b*, through the seventh optical waveguide 288*a* and the eighth optical waveguide 288*b*, and to the inputs of the combiner 284. When the portions of the CW optical signal 103*a* and the CCW optical signal 103*b* are combined by the optical combiner 284, constructive and destructive interference of the portions creates an optical beat note signal 286. The output of the combiner 284 is coupled to the fourth photodetector 113. Thus, the optical beat note pickoff signal 286 is coupled to the fourth photodetector 213; the fourth photodetector 113 converts the optical beat note pickoff signal 286 to an electrical beat signal. The electrical beat signal is coupled to the beat note detector 112.

The illustrated RFOG optical processing system 204A-1 comprises a first portion of a second optical waveguide 228*b*-1, a first portion fourth of a optical waveguide 228*d*-1, a third optical waveguide 228*c*, a fourth optical waveguide 228*d*, a first coupling optics 220*a*, a second coupling optics 220*b*, a third coupling optics 220*c*, a fourth coupling optics 220*d*, a first optical circulator 230*a*, a second optical circulator 230*b*, a first beam splitter 224*a*, a second beam splitter 224*b*, a first mirror 225*a*, a second mirror 225*b*, a third mirror 225*c*, a fourth mirror 225*d*, first port 226*a*, second port 226*b*, third port 226*c*, fourth port 226*d*, and a blocker 229. The blocker 229 is a device that prevents the passage of optical signals in a specific frequency band, e.g. between the third mirror 225*c* and the fourth mirror 225*d*. The specific frequency band would be the frequencies of at least the CW optical signal 103*a* and the CCW optical signal 103*b*. The blocker 229 can be made from a dielectric, metal, and/or semiconductor.

Each of the optical waveguides or portions thereof may be an optical fiber or a planar, e.g. silicon, waveguides. Each of the coupling optics may be a ball lens or a gradient index lens. Each of the ports may be detector collection optics, e.g. a mirror, a prism, or a collection optics (such as a ball lens) and an optical waveguide, and/or a prism, or a photodetector, e.g. an angled photodetector to minimize reflections; for pedagogical purposes, detector collection optics coupled to external photodiodes are exemplified herein. The mirrors referred to herein may be fabricated from dielectric(s) and/or metal(s).

The first optical circulator 230*a* is in a first optical path and a second optical path between the second coupling optics 220*b* and the third mirror 225*c*. The second optical circulator 230*b* is in a third optical path and a fourth optical path between the fourth coupling optics 220*d* and the fourth mirror 225*d*. In one embodiment, the resonator loop closure optics system 207 comprises the first optical waveguide 228*a*, the third optical waveguide 228*c*, the first coupling optics 220*a*, the third coupling optics 220*c*, the first beam splitter 224*a*, and the second beam splitter 224*b*.

The second optical waveguide 228*b* and the fourth optical waveguide 228*d* are configured to be optically coupled to the beat note pickoff system 204A-2, and respectively receive a portion of the CW optical signal 103*a* and a second portion of the CCW optical signal 103*b*. These portions of the CW optical signal 103*a* and second portion of the CCW optical signal 103*b* are respectively received from the CW divider 282*a* and the CCW divider 282*b* of the beat note pickoff system 204A-2.

The first optical waveguide 228*a* and the third optical waveguide 228*c* are configured to be coupled to the optical resonator coil 102. The first optical waveguide 228*a* is configured to transmit to and receive from the optical resonator coil 102 respectively a CW optical signal 103*a*-2 and a CCW optical signal 103*b'*. The third optical waveguide 228*c* is configured to respectively transmit and receive from the optical resonator coil 102 a CCW optical signal 103*b'* and a CW optical signal 103*a'*. The first port 226*a*, the second port 226*b*, and the third port 226*c* are respectively optically coupled to the first photodetector (PD1) 106*a*, a fifth photodetector (PD5) (the fifth photodetector is optional, and is not shown in FIG. 1), and the second photodetector (PD2) 106*b*. The fourth port 226*d* is optically coupled to the third photodetector (PD3) 106*c*. Optionally, optical absorbing or deflecting material may be used in lieu of the fifth photodetector (PD5) if no fourth photodiode is used.

The second coupling optics 220*b* and the fourth coupling optics 220*d* respectively receive the portion of the CW optical signal 103*a* and the portion of the CCW optical signal 103*b* from the second optical waveguide 228*b* and the fourth optical waveguide 228*d*, collimate, and focus the portion of the CW optical signal 103*a* and the portion of the CCW optical signal 103*b* respectively on the first optical circulator 230*a* and the second optical circulator 230*b*.

A portion of the CW optical signal 103*a* and a portion of the CCW optical signal 103*b* respectively passes through the first optical circulator 230*a* and the second optical circulator 230*b* to a third mirror 225*c* and a fourth mirror 225*d*. The third mirror 225*c* and the fourth mirror 225*d* reflect the portions of the CW optical signal 103*a* and CCW optical signal 103*b*. Note, the third mirror 225*c* and the fourth mirror 225*d* are optional as the second portion of the second optical waveguide 228*b*-1, the second coupling optics 220*b*, and the first optical circulator 230*a*, and the second portion of the fourth optical waveguide 228*d*-2, the fourth coupling optics 220*d*, and the second optical circulator can be rotated by ninety degrees (as subsequently illustrated).

These portions of the CW optical signal 103*a* and the CCW optical signal 103*b* (from the optical circulators or mirrors) are respectively incident upon the first beam splitter 224*a* and the second beam splitter 224*b*. In one embodiment, the first beam splitter 224*a* and the second beam splitter 224*b* do not discriminate based upon polarization, i.e. are non-polarizing. The first beam splitter 224*a* and the second beam splitter 224*b* transmit portions of respectively of the CW optical signal 103*a* and the CCW optical signal 103*b*, incident upon corresponding beam splitters, respectively to the first mirror 225*a* and the second mirror 225*b*. These portions comprise a relatively large percentage, e.g. about ninety-seven percent of the power of the respective optical signals incident upon the beam splitters. The first mirror 225*a* and the second mirror 225*b* reflect the portions respectively to the first port 226*a* and the second port 226*b*. For purposes of clarity the second mirror 225*b* and the second port 226*b* are optional, and may not be used if photodetector PD5 is not used.

The first beam splitter 224*a* and the second beam splitter 224*b* serve as the input and output couplers for the resonator closure optics 207. The portions of respectively the CW optical signal and the CCW optical signal reflected from the first beam splitter 224*a* and the second beam splitter 224*b* enter the optical resonator, e.g. the resonator loop closure optics system 207. Specifically, the first beam splitter 224*a* and the second beam splitter 224*b* reflect portions (CW optical signal 103*a*', CW optical signal 103*b*') of respectively the CW optical signal and the CCW optical signal to respectively the first coupling optics 220*a* and first optical waveguide 228*a*, and the third coupling optics 220*c* and the third optical waveguide 228*c*. The reflected portions comprise a relatively small percentage, e.g. between one and ten percent (such as about three percent), of the power of the respective optical signals incident upon the beam splitters. The CW optical signal 103*a*' and the CCW optical signal 103*b*' propagate around the optical resonator.

The CW optical signal 103*a*' propagating through the optical resonator coil 102 passes through the third optical waveguide 228*c* and the third coupling optics 220*c*. Upon becoming incident upon the second beam splitter 224*b*, the second beam splitter 224*b* reflects a portion of the CW optical signal 103*a*' to the fourth mirror 225*d*. The portion incident upon the fourth mirror 225*d* comprises a relatively small percentage, e.g. between one to ten percent (such as about three percent), of the power of the optical signal incident upon the second beam splitter 224*b* from the third coupling optics 220*c*. The other portion of the CW optical signal 103*a*' continues to propagate through the first beam splitter 224*a*, the first coupling optics 220*a*, the first optical waveguide 228*b*, and back through the optical resonator coil 102.

When the portion of the CW optical 103*a*' signal is reflected by the fourth mirror 225*d*, the portion of the CW optical signal 103*a*' passes through the second circulator 230*b*. When the portion of the CW optical signal 103*a*' passes through the second circulator 230*b*, most or the entire portion is optically coupled to the fourth port 226*d*.

The CCW optical signal 103*b*' propagating from the optical resonator coil 102 into the optical processing system with a beat note pickoff system 204A is analogously processed as described above. However, the CCW optical signal 103*b*' is processed by the first optical waveguide 228*a*, the first coupling optics 220*a*, the first beam splitter 224*a*, the third mirror 225*c*, the first circulator 230*a*, and the third port 226*c*.

Figure 2B:
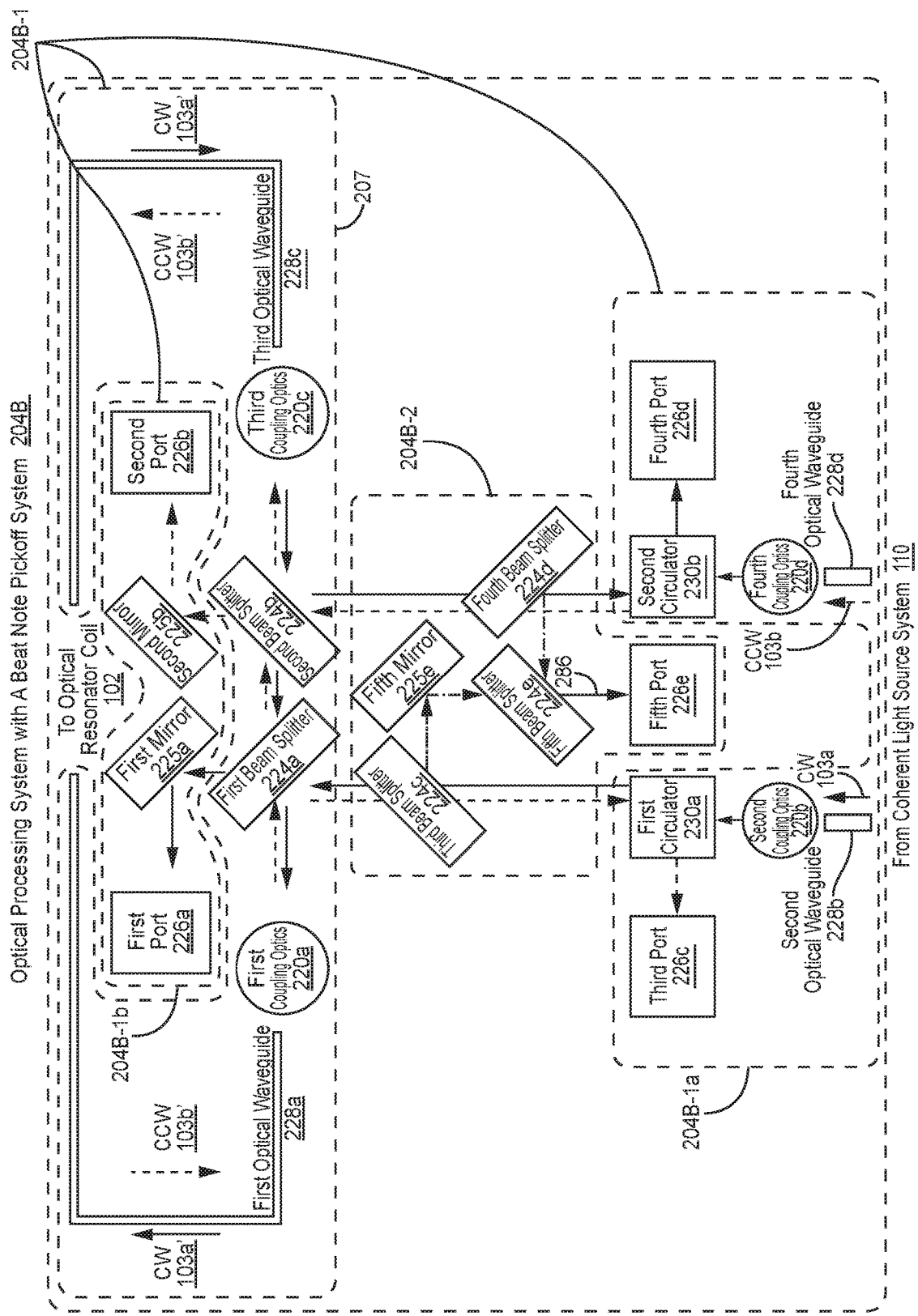
FIG. 2B illustrates another embodiment of an optical processing system with a beat note pickoff system.

FIG. 2B illustrates another embodiment of an optical processing system with a beat note pickoff system (optical processing system) 204B. The optical processing system 204B comprises an RFOG optical processing system 204B coupled to a beat note pickoff system 204B-2. The RFOG optical processing system comprises a first portion of the RFOG optical processing system (first portion) 204B-1*a*, the resonator loop closure optics system 207, and a second portion of the RFOG optical processing system (second portion) 204B-1*b*. The first portion 204B-1*a* is coupled to the resonator loop closure optics system 207 through the beat note pickoff system 204B-2. The second portion 204B-1*b* is coupled to the resonator loop closure optics system 207.

The first portion 204B-1*a* comprises the second optical waveguide 228*b*, the fourth optical waveguide 228*d*, the second coupling optics 220*b*, the fourth coupling optics 220*d*, the first circulator 230*a*, the second circulator 230*b*, the third port 226*c*, and fourth port 226*d*. The second portion comprises the first mirror 225*a*, the second mirror 225*b*, the first port 226*a*, and the second port 226*b*.

For purposes of clarity, the RFOG optical processing system does not include the beat note pickoff system 204B-2. The beat note pickoff system 204B-2 comprises a third beam splitter 224*c*, a fourth beam splitter 224*d*, a fifth beam splitter 224*e*, a fifth mirror 225*e*, and fifth port 226*e*.

The optical processing system with a beat note pickoff system 204B operates like the optical processing system with a beat note detector system 204A described above. Specifically, the position and implementation of the beat note detector system 204B-2 has been changed with respect to the beat note detector system 204A-2 of FIG. 2A.

In FIG. 2B, the CW optical signal 103*a* and the CCW optical signal 103*b* emitted respectively from the first circulator 230*a* and the second circulator 230*b* of the RFOG optical processing system 204B-1 are respectively incident upon the third beam splitter 224*c* and the fourth beam splitter 224*d*. In one embodiment, the third beam splitter 224*c* and the fourth beam splitter 224*d* do not discriminate based upon polarization, i.e. are non-polarizing. The third beam splitter 224*c* and the fourth beam splitter 224*d* transmit portions of the CW optical signal 103*a* and the CCW optical signal 103*b*, incident upon corresponding beam splitters, respectively to the first beam splitter 224*a* and the second beam splitter 224*b* of the RFOG optical processing system 204B-1. These portions, coupled to the RFOG optical processing system 204B-1, comprise a relatively large percentage, e.g. about ninety-seven percent of the power of the respective optical signals incident upon the third beam splitter 224*c* and the fourth beam splitter 224*d*.

Other portions of the CW optical signal 103*a* and the CCW optical signal 103*b* are respectively coupled from the third beam splitter 224*c* and the fourth beam splitter 224*d* to a fifth mirror 225*e* and a fifth beam splitter 224*e*. Such portions typically have correspondingly smaller power levels then the power levels of the portions of the CW optical signal 103*a* and the CCW optical signal 103*b* coupled to the resonator loop closure optics system 207 from the beat note pickoff system 204B-2. The portion of the CW optical signal 103*a* reflected by the fifth mirror 225*e* propagates through the fifth beam splitter 224*e* to the fifth port 226*e*. The portion of the CCW optical signal 103*b* reflected by the fourth beam splitter 224*d* is further reflected by the fifth beam splitter 224*e* to the fifth port 226*e*. When the portions of the CW optical signal 103*a* and the CCW optical signal 103*b* are combined at the output of the fifth beam splitter 224*e*, the optical beat note pickoff signal 286 is created. The fifth port 226*e* is optically coupled to the fourth photodetector (PD4) 113. Thus, the optical beat note pickoff signal 286 is coupled to the fourth photodetector 213; the fourth photodetector 113 converts the optical beat note pickoff signal 286 to an electrical beat note pickoff signal. The electrical beat signal is coupled to the beat note detector system 112.

Figure 2C:
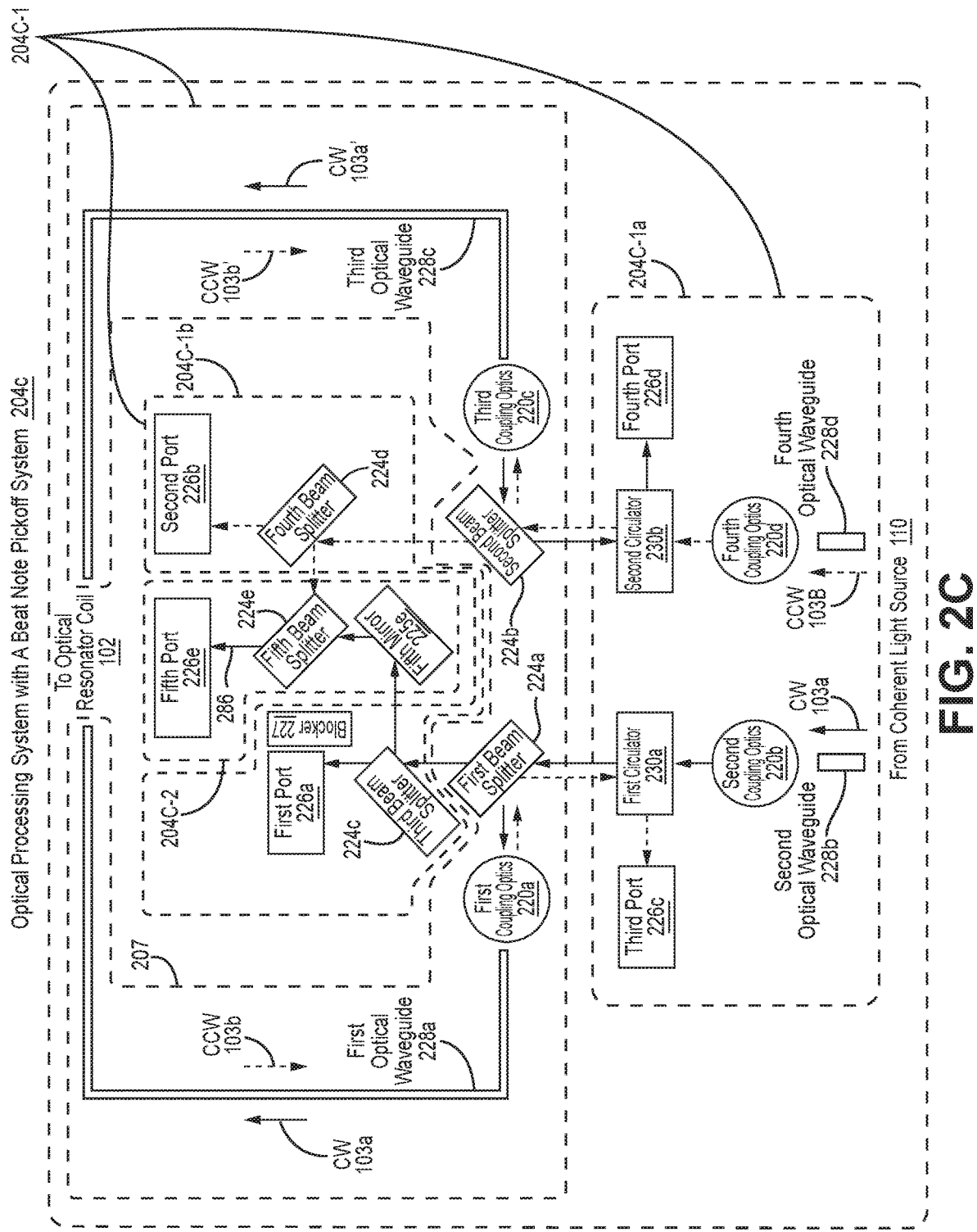
FIG. 2C illustrates a further embodiment of an optical processing system with a beat note pickoff system.

FIG. 2C illustrates a further embodiment of an optical processing system with a beat note pickoff system (optical processing system) 204C. The optical processing system 204C comprises an RFOG optical processing system 204C-1 coupled to a beat note pickoff system 204C-2. The RFOG optical processing system 204C-1 comprises the resonator loop closure optics system 207, the first port 226*a*, and the second port 226*b*. A first portion of the RFOG optical processing system (first portion) 204C-1*a* is coupled to the resonator loop closure optics system 207. The beat note pickoff system 204C-2 is coupled to the resonator loop closure optics system 207. The second portion 204C-1*b* and the first port 226*a* are coupled to the beat note pickoff system 204C-2.

The first portion 204C-1*a* comprises the same components described above with respect to the first portion 204B-1*a* of FIG. 2B. For purposes of clarity, the RFOG optical processing system does not include the beat note pickoff system 204C-2. The beat note pickoff system 204C-2 comprises a third beam splitter 224*c*, a fourth beam splitter 224d, a fifth beam splitter 224e, a fifth mirror 225e, fifth port 226e, and a blocker 227. The blocker 227 optically isolates the first port 226a and the fifth beam splitter 224e. All blockers 227 described herein are optional components, and are not required for implementing the embodiments of the invention.

The optical processing system with a beat note pickoff system 204C operates like the optical processing system with a beat note detector system 204B described above. Specifically, the position and implementation of the beat note detector system 204B-2 has been changed with respect to the beat note detector system 204A-2 of FIG. 2A.

In FIG. 2C, the CW optical signal 103a and the CCW optical signal 103b emitted respectively from the first circulator 230a and the second circulator 230b of the first portion 204C-1a are respectively incident upon the first beam splitter 224a and the second beam splitter 224b. In one embodiment, the first beam splitter 224a and the second beam splitter 224b do not discriminate based upon polarization, i.e. are non-polarizing. The first beam splitter 224a and the second beam splitter 224b transmit portions of the CW optical signal 103a and the CCW optical signal 103b, incident upon corresponding beam splitters, respectively to the third beam splitter 224c and the fourth beam splitter 224d of the beat note pickoff system 204C-2. These portions, coupled to the beat note pickoff system 204C-2, comprise a relatively small percentage, e.g. about three percent of the power of the respective optical signals incident upon the first beam splitter 224a and the second beam splitter 224b. Such portions typically have correspondingly smaller power levels then the power levels of the portions of the CW optical signal 103a and the CCW optical signal 103b coupled within the resonator loop closure optics system 207.

Portions of the CW optical signal 103a and the CCW optical signal 103b are respectively coupled from the third beam splitter 224c and the fourth beam splitter 224d to the first port 226a and the second port 226b. Other portions of the CW optical signal 103a and the CCW optical signal 103b are respectively coupled to a fifth mirror 225e and a fifth beam splitter 225e. The portion of the CW optical signal 103a reflected by the fifth mirror 225e propagates through the fifth beam splitter 224e to the fifth collection optics 226e. The portion of the CCW optical signal 103b reflected by the fourth beam splitter 224d is further reflected by the fifth beam splitter 224e to the fifth collection optics 226e. When the portions of the CW optical signal 103a and the CCW optical signal 103b are combined at the output of the fifth beam splitter 224e, the optical beat note pickoff signal 286 is created. The fifth collection optics 226e is optically coupled to the fourth photodetector (PD4) 113. Thus, the optical beat note pickoff signal 286 is coupled to the fourth photodetector 213; the fourth photodetector 113 converts the optical beat note pickoff signal 286 to an electrical beat note pickoff signal. The electrical beat signal is coupled to the beat note detector system 112.

Figure 3:
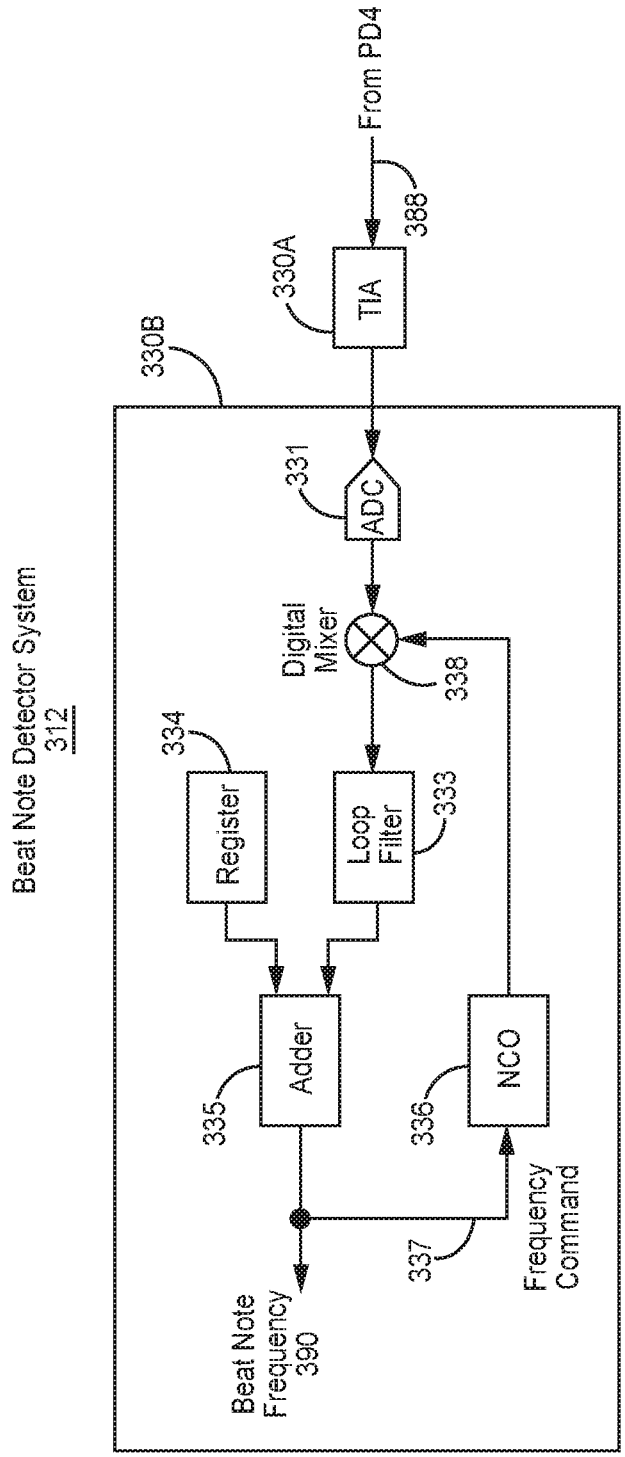
FIG. 3 illustrates a block diagram of one embodiment of a beat note detector system.

FIG. 3 illustrates a block diagram of one embodiment of a beat note detector system 312. The beat note detector system 314 is configured to detect, or measure, the frequency of the beat note signal created by the CW optical signal and the CCW optical signals; the beat note between the optical carrier frequencies of the clockwise and counter clockwise optical signals, Δf, in the presences of other frequency components. In one embodiment, the beat note detector system 312 comprises a digital phase locked loop 330B which performs such detection function.

Optionally, the beat note detector system 312 includes a transimpedance amplifier 330. The transimpedance amplifier (TIA) 330A is coupled between the fourth photodetector PD4 and the digital phase locked loop, and is configured to receive an electrical signal, i.e. a current signal, from the fourth photo detector. The transimpedance amplifier 330A converts to current signal from the fourth photodetector PD4 to a voltage signal.

The digital phase locked loop 330B is implemented with digital signal processing. In one embodiment, the digital phase locked loop comprises an analog to digital converter (ADC) 331, a digital mixer 338, a digital loop filter (loop filter) 333, a digital adder (adder) 335, a register 334, and a numerically controlled oscillator 336. The digital mixer 338 may be implemented with a digital multiplier. The loop filter 333 may be implemented with an infinite or finite impulse filter.

The electrical beat note detector pickoff signal 388 is an analog signal. The ADC digitizes the electrical beat note detector pickoff signal 388 (whether a current signal or a voltage signal). The digital phase locked loop 330B digitizes the analog electrical beat note detector pickoff signal, and lock an output frequency of the NCO 336 to a beat note frequency, i.e. a digital value of the beat note frequency, and with a 90-degree phase difference from the electrical beat note signal. A first input of the digital mixer 338 is configured to receive the digitized electrical beat note detector pickoff signal. A second input of the digital mixer 338 is configured to be coupled to an output of the NCO 336, and to receive an output signal from the NCO 336. An input of the loop filter 333 is configured to be coupled to an output of the digital mixer 338, and to receive an output signal of the digital mixer 338. A first input of the adder 335 is configured to be coupled to an output of the loop filter 333, and to receive a phase error signal from the digital mixer 338. A second input of the adder 335 is configured to be coupled to a register 334, and to receive an estimated beat frequency from the register 334. The output of the adder 335 is an output of the beat note detector system 312 and the digital phase locked loop 330B, and is configured to provide the digital value of the beat note frequency (beat note frequency data) 390. The output of the adder 335 is also coupled to an input of the NCO 336, is configured to provide frequency control words to the NCO 336.

The loop filter 333 may be, e.g. a low pass filter having a cutoff frequency or alternatively an integrator with a zero and may provide gain to the feedback loop. In one embodiment a bandwidth and gain of the loop filter may be such that the phase lock loop bandwidth is between one to two kilohertz; however the bandwidth may be different. The loop filter 333 and the output frequency of the NCO 336 are designed so the difference between initial output frequency of the NCO 336 and the frequency of the electrical beat signal falls within the passband of the digital phase lock loop 330A. The loop filter 333 is also designed so that the difference between the output frequency of the NCO 336 and undesired frequency components, e.g. modulation sidebands, falls outside of the passband of the digital phase lock loop 330A. As a result, the digital phase lock loop 330B locks the NCO 336 onto the beat note frequency and 90-degree phase of the digitized electrical beat note signal, and not onto a frequency of the other frequency components.

The RFOG with a beat note detector 100 knows, within at least a hertz, an estimated beat note frequency. The estimated beat note frequency may be from the feed-forward rate processor described above with reference to the '189 Patent. Optionally, the feed-forward rate processor may be implemented with a microcontroller, an FPGA or digital application integrated circuit.

Before the digital phase lock loop 330B is closed, the estimated beat note frequency is stored in the register 334, and then remains unchanged after the digital phase lock loop 330A is closed. The estimated beat note frequency is used to set the frequency of the NCO 337 close to the frequency of the electrical beat note signal. The output of the loop filter 333 provides the difference in 90-degree phase between the output signal of the NCO 336 and the electrical beat signal (phase difference). The adder 335 adds the estimated beat note frequency from the register 334 and a change over time in phase difference from the loop filter 333 to determine a frequency command 337 and beat note frequency data 390. The beat note frequency data 390 is provided by the output of the adder 335 to an input of the processing system 108. The frequency command 337 is provided from the output of the adder 335 to the input of the NCO 336, includes the differential phase data, and is accumulated by the NCO 336 to set a new output frequency of the NCO 336. As a result, the digital PLL quickly locks to the frequency difference between CW and CCW optical signals proximate to the optical resonator; the difference is given by the electrical beat note signal.

Because the electrical beat signal received at the first input of the digital mixer 338 and the output signal of the NCO 336, received at the second input of the digital mixer 338, are very close in frequency, and because loop has high gain, the closed loop drives the output of the digital mixer 338 to be zero. The digital mixer 338 has a zero output when the NCO 336 has a frequency of the digitized electrical beat note signal but offset with a ninety degree phase shift. As the RFOG rotates around its axis, the beat note frequency will change. The output of the adder 335, as driven by the digital mixer 338 and loop filter 333, will cause the NCO 336 to change its output frequency correspondingly so that it tracks the beat note frequency and 90-degree phase.

Operation of an exemplary RFOG with an optical processing system with a beat note pickoff system will now be further described. Processing to extract beat note frequency data will be exemplified.

Figure 4:
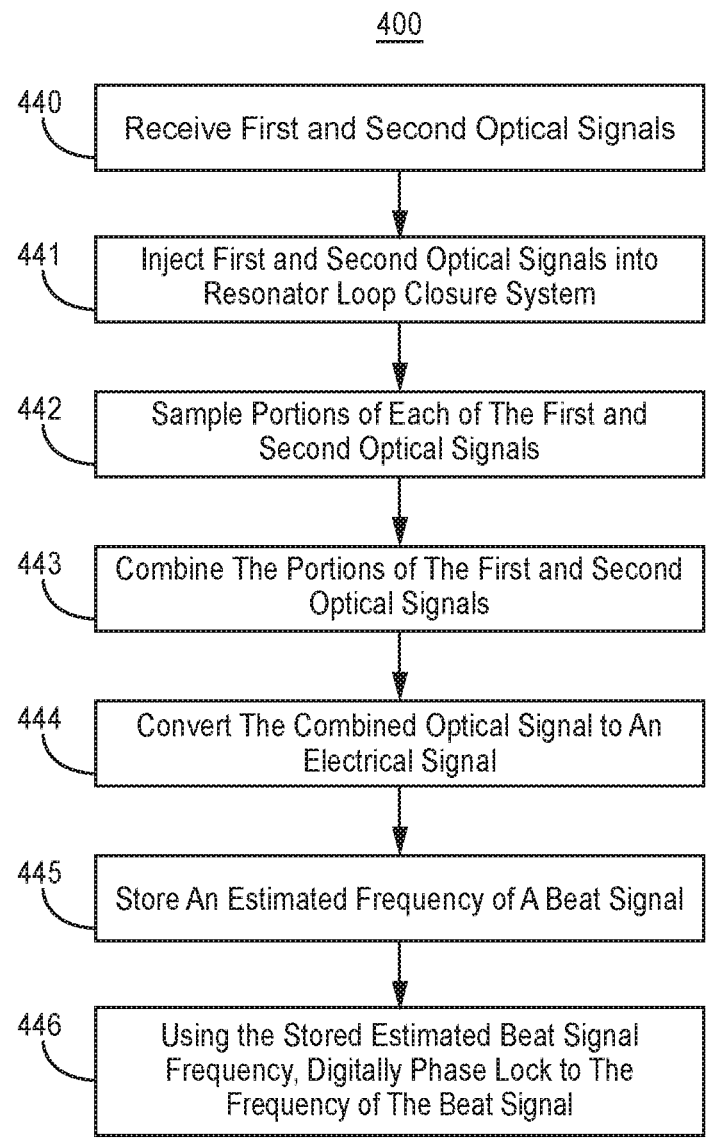
FIG. 4 illustrates an exemplary method of detecting a beat note in a resonant fiber optic gyroscope.

FIG. 4 illustrates an exemplary method 400 of detecting a beat note in an RFOG. To the extent the method 400 shown in FIG. 4 is described herein as being implemented in the system shown in FIGS. 1-3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440, receive a first optical signal and a second optical signal at or near an optical resonator, where the first optical signal includes a clockwise (CW) optical signal and the second optical signal includes a counter clockwise optical signal. Optionally, the first optical signal and the second optical signal are received from the coherent light source system 110. In block 441, inject the first optical signal and the second optical signal into a resonator loop closure optics system of the optical resonator.

In block 442, sample a portion of the first optical signal and a portion of the second optical signal, where the first optical signal and the second optical signal either enter or exit the optical resonator. Sampling is accomplished, e.g. by coupling the portions of the first and the second optical signals respectively from the first and the second optical signals with optical couplers or optical power dividers. Optionally, sample a portion of the first optical signal and a portion of the second optical signal after the resonator loop closure optics system. Optionally, sample a portion of the first optical signal and a portion of the second optical signal before, e.g. immediately before, the resonator loop closure optics system.

In block 443, combine the portion of the first optical signal and the second optical signal. Combining is accomplished, e.g. by combing portions of the first and the second optical signals with an optical coupler, an optical power combiner, or an optical prism. In block 444, convert the combined optical signals to an electrical signal. Optionally, convert the combined optical signal to an analog electrical signal, e.g. with a photodetector having an output current corresponding to the incident power of the combined optical signals. Then, transform the output current to a voltage, e.g. with a transimpedance amplifier. Finally, digitize the analog electrical signal to digital electrical signal.

In block 445, store an estimated frequency of a beat signal created by a combination of the CW optical signal and the CCW optical signal. In one embodiment, store the beat signal frequency as a digital word. In block 446, using the stored estimated beat signal frequency, digitally phase lock to the frequency of the beat signal. Digitally phase lock means phase locking using digital signal processing techniques. Optionally, output an electrical signal, e.g. a data word, corresponding to the beat frequency of the CW and CCW optical signals. Optionally, determine the rotation rate of the RFOG using the beat signal frequency determined by phase locking.

EXAMPLE EMBODIMENTS

Example 1 includes a resonant fiber optic gyroscope (RFOG), comprising: a coherent light source system comprising at least two optical sources; an optical processing system coupled to the coherent light source system; an optical resonator coil, having a first port and a second port, configured to be coupled to the optical processing system; wherein the optical resonator coil is configured to receive a clockwise (CW) optical signal and a counter clockwise (CCW) optical signal generated by the coherent light source system; wherein the optical processing system comprises a resonator loop closure optics system and a beat note pickoff system; wherein the optical resonator coil is optically coupled to the resonator loop closure optics system; a first photodetector having an input coupled to the optical processing system and an output coupled to the coherent light source system; a second photodetector having an input coupled to the optical processing system and an output coupled to the coherent light source system; a third photodetector having an input coupled to the optical processing system and an output coupled to the coherent light source system; a fourth photodetector having an output and an input coupled to the beat note pickoff system; and wherein the beat note detector system comprises a digital phased lock loop, and is coupled to the output of the fourth photo detector.

Example 2 includes the RFOG of Example 1, further comprising a digital data processing system coupled to the output of the beat note detector system.

Example 3 includes the RFOG of any of Examples 1-2, wherein the beat note detector system is coupled to the coherent light source system.

Example 4 includes the RFOG of any of Examples 1-3, wherein the coherent light source system comprises: a master optical source; a CW slave optical source; a CCW slave optical source; a CW optical phase lock loop configured to be coupled to the CW slave optical source and the master optical source; a CCW optical phase lock loop configured to be coupled to the CCW slave optical source and the master optical source; a CW resonance tracking servo system coupled to the CW optical phase lock loop and the output of the third photodiode; a CCW resonance tracking servo system coupled to the CCW optical phase lock loop and the output of the second photodiode; a Pound Dreyer Hall (PDH) servo system coupled to the master optical source and the output of the first photodiode; and a optical combiner coupled to the CW slave optical source, the master optical source, and the optical processing system with a beat note pickoff system.

Example 5 includes the RFOG of any of Examples 1-4, wherein the digital phase locked loop comprises: an analog to digital converter including an output; a digital mixer including a first input, a second input, and an output, wherein the first input is coupled to the output of the analog to digital converter; a loop filter, including an input and an output, wherein the input is coupled to the output of the digital mixer; an adder, including a first input, a second input, and an output, wherein the output of the loop filter is coupled to the first input of the adder; a register including an output coupled to the second input of the adder; and a numerically controlled oscillator including an input and an output, wherein the input is coupled to the output of the adder and the output is coupled to the second input of the digital mixer.

Example 6 includes the RFOG of any of Examples 1-5, wherein the register is configured to receive an estimated beat note frequency.

Example 7 includes the RFOG of any of Examples 1-6, wherein the beat note detector system further comprises a transimpedance amplifier coupled between the fourth photodiode and the digital phase locked loop.

Example 8 includes the RFOG of any of Examples 1-7, wherein the beat note pickoff system comprises: a CW optical divider having a input configured to received a CW optical signal and an output; a CCW optical divider having a input configured to received a CCW optical signal and an output; an optical combiner having a first input coupled to the output of the CW optical divider, a second input coupled to the output of the CCW optical combiner, and an output coupled to the fourth photodiode.

Example 9 includes the RFOG of any of Examples 1-8, wherein the beat note pickoff system comprises: a first beam splitter; a second beam splitter; a third beam splitter optically coupled to the second beam splitter; a first mirror optically coupled to the first beam splitter and the third beam splitter; and port optically coupled to the third beam splitter and the input of the fourth photodiode.

Example 10 includes the RFOG of any of Examples 1-9, wherein the resonator loop closure optics system comprises: a first beam splitter; a second beam splitter optically coupled to the first beam splitter; a first coupling optics optically coupled to the first beam splitter; a second coupling optics optically coupled to the second beam splitter; a first optical waveguide optically coupled to the first coupling optics and the optical resonator coil; and a second optical waveguide optically coupled to the second coupling optics and the optical resonator coil.

Example 11 includes a system, comprising: an optical processing system comprising a resonator loop closure optics system and a beat note pickoff system; wherein the resonator loop closure optics system is configured to be coupled to an optical resonator coil; wherein the optical processing system is configured to receive at least two optical signals; and wherein the beat not detector pickoff system comprises: a first beam splitter; a second beam splitter; a third beam splitter optically coupled to the second beam splitter; a first mirror optically coupled to the first beam splitter and the third beam splitter; and port optically coupled to the third beam splitter, and is configured to be coupled to an input of a photodiode.

Example 12 includes the system of Example 11, further comprising: the photodiode having the input coupled to the port and an output; a beat note detector system comprising a digital phased lock loop, and having a first input coupled to the output of the photodiode.

Example 13 includes the system of Example 12, wherein the digital phase locked loop comprises: an analog to digital converter including an output; a digital mixer including a first input, a second input, and an output, wherein the first input is coupled to the output of the analog to digital converter; a loop filter, including an input and an output, wherein the input is coupled to the output of the digital mixer; an adder, including a first input, a second input, and an output, wherein the output of the loop filter is coupled to the first input of the adder; a register including an output coupled to the second input of the adder; a numerically controlled oscillator including an input and an output, wherein the input is coupled to the output of the adder and the output is coupled to the second input of the digital mixer.

Example 14 includes the system of any of Examples 11-13, wherein the resonator loop closure optics system comprises: a first beam splitter; a second beam splitter optically coupled to the first beam splitter; a first coupling optics optically coupled to the first beam splitter; a second coupling optics optically coupled to the second beam splitter; a first optical waveguide optically coupled to the first coupling optics and the optical resonator coil; and a second optical waveguide optically coupled to the second coupling optics and the optical resonator coil.

Example 15 includes a method, comprising: receiving a clockwise (CW) optical signal and the second optical signal includes a counter clockwise (CCW) optical signal; injecting the first optical signal and the second optical signal into a resonator loop closure optics system of the optical resonator; sampling a portion of the first optical signal and a portion of the second optical signal where the first optical signal and the second optical signal either enter or exit the optical resonator; combining the portions of the first optical signal and the second optical signal; converting the combined optical signals to an analog electrical signal; digitizing the analog electrical signal; storing an estimated frequency of a beat signal created by a combination of the CW optical signal and the CCW optical signal; and using the stored estimated beat signal frequency, digitally phase lock to a frequency of the beat signal.

Example 16 includes the method of Example 15, wherein sampling a portion of the first optical signal and a portion of the second optical signal at or near the optical resonator comprises sampling a portion of the first optical signal and a portion of the second optical signal after the resonator loop closure optics system.

Example 17 includes the method of any of Examples 15-16, wherein combining the portion of the first optical signal and the second optical signal comprises combining the portion of the first optical signal and the second optical signal in a prism.

Example 18 includes the method of any of Examples 15-17, wherein converting the combined optical signals to combined electrical signals comprises converting the combined optical signals to electrical signals with a photodiode.

Example 19 includes the method of any of Examples 15-18, further comprising transforming the electrical signal from a current signal to a voltage signal.

Example 20 includes the method of Example 15-19, further comprising determining a rotation rate of an optical resonator using the beat signal frequency determined by phase locking, where the optical resonator forms part of a gyroscope.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk - Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium and executed by the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g. data files. Although separate databases are recited herein, one or more of such databases may be combined.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonant fiber optic gyroscope (RFOG), comprising:
   a coherent light source system comprising at least two optical sources;
   an optical processing system coupled to the coherent light source system;
   an optical resonator coil, having a first port and a second port, configured to be coupled to the optical processing system;
   wherein the optical resonator coil is configured to receive a clockwise (CW) optical signal and a counter clockwise (CCW) optical signal generated by the coherent light source system;
   wherein the optical processing system comprises a resonator loop closure optics system and a beat note pickoff system;
   wherein the beat note pickoff system comprises a first optical divider, a second optical divider, and an optical combiner, and is configured to couple the CW optical signal through the first optical divider and the CCW optical signal through the second optical divider into the resonator loop closure optics and to provide the CW optical signal and the CCW optical signal at an output of the optical combiner;
   wherein the resonator loop closure optics system comprises a first beam splitter and a second beam splitter, and is configured to couple the CW optical signal through the first beam splitter and the CW optical signal through the second beam splitter into the optical resonator coil, and where the first beam splitter and the second beam splitter facilitate circulation of the CW optical signal and the CW optical signal through the resonator loop closure optics system and the optical resonator coil;
   wherein the optical resonator coil is optically coupled to the resonator loop closure optics system;
   a first photodetector having an input coupled to the optical processing system and an output coupled to the coherent light source system;
   a second photodetector having an input coupled to the optical processing system and an output coupled to the coherent light source system;
   a third photodetector having an input coupled to the optical processing system and an output coupled to the coherent light source system;

a fourth photodetector having an input coupled to the beat note pickoff system, and an output, where the fourth photodetector is configured to receive the CW optical signal and the CCW optical signal, from the output of the optical combiner, at the input of the fourth photodiode; and a beat note detector circuit comprising phase lock loop circuitry, where the beat note detector circuit is coupled to the output of the fourth photo detector and is configured to receive an estimated beat note frequency from a circuit configured to generate an estimated beat note frequency, to receive an electrical beat note pickoff signal from the output of the fourth photo detector, and to generate a signal representing a beat note frequency based upon the estimated beat note frequency and the electrical beat note pickoff signal;

wherein the beat note detector circuit is configured to be coupled to processing circuitry configured to determine a rate of rotation using the beat note frequency.

2. The RFOG of claim 1, wherein the beat note detector circuit is coupled to the coherent light source system.

3. The RFOG of claim 1, wherein the coherent light source system comprises:
a master optical source;
a CW slave optical source;
a CCW slave optical source;
a CW optical phase lock loop configured to be coupled to the CW slave optical source and the master optical source;
a CCW optical phase lock loop configured to be coupled to the CCW slave optical source and the master optical source;
a CW resonance tracking servo system coupled to the CW optical phase lock loop and the output of the third photodiode;
a CCW resonance tracking servo system coupled to the CCW optical phase lock loop and the output of the second photodiode;
a Pound Dreyer Hall (PDH) servo system coupled to the master optical source and the output of the first photodiode; and
an optical combiner coupled to the CW slave optical source, the master optical source, and the optical processing system with a beat note pickoff system.

4. The RFOG of claim 1, wherein the phase locked loop circuitry comprises:
an analog to digital converter including an output;
a digital mixer including a first input, a second input, and an output, wherein the first input is coupled to the output of the analog to digital converter;
a loop filter, including an input and an output, wherein the input is coupled to the output of the digital mixer;
an adder, including a first input, a second input, and an output, wherein the output of the loop filter is coupled to the first input of the adder;
a register including an output coupled to the second input of the adder;
wherein the register is configured to receive the estimated beat note frequency; and
a numerically controlled oscillator including an input and an output, wherein the input is coupled to the output of the adder and the output is coupled to the second input of the digital mixer.

5. The RFOG of claim 1, wherein the beat note detector circuit further comprises a transimpedance amplifier coupled between the fourth photodiode and the phase locked loop circuitry.

6. The RFOG of claim 1, wherein the beat note pickoff system comprises:
a CW optical divider having an input configured to receive a CW optical signal and an output;
a CCW optical divider having an input configured to receive a CCW optical signal and an output; and
an optical combiner having a first input coupled to the output of the CW optical divider, a second input coupled to the output of the CCW optical combiner, and an output coupled to the fourth photodiode.

7. The RFOG of claim 1, wherein the beat note pickoff system comprises:
a first beam splitter;
a second beam splitter;
a third beam splitter optically coupled to the second beam splitter;
a first mirror optically coupled to the first beam splitter and the third beam splitter; and
a port optically coupled to the third beam splitter and the input of the fourth photodiode.

8. The RFOG of claim 1, wherein the resonator loop closure optics system comprises:
a first beam splitter;
a second beam splitter optically coupled to the first beam splitter;
a first coupling optics optically coupled to the first beam splitter;
a second coupling optics optically coupled to the second beam splitter;
a first optical waveguide optically coupled to the first coupling optics and the optical resonator coil; and
a second optical waveguide optically coupled to the second coupling optics and the optical resonator coil.

* * * * *